United States Patent
Wang et al.

(10) Patent No.: US 12,077,883 B2
(45) Date of Patent: Sep. 3, 2024

(54) HIGH-STRENGTH THERMAL-STABILITY POLYESTER INDUSTRIAL YARN AND PREPARATION METHOD THEREOF

(71) Applicant: JIANGSU HENGLI CHEMICAL FIBRE CO., LTD., Suzhou (CN)

(72) Inventors: Shanshui Wang, Suzhou (CN); Fangming Tang, Suzhou (CN); Lili Wang, Suzhou (CN); Yiwei Shao, Suzhou (CN); Yanli Zhao, Suzhou (CN); Xiaoyu Wang, Suzhou (CN); Chaoming Yang, Suzhou (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 0 days.

(21) Appl. No.: 18/269,968

(22) PCT Filed: Aug. 25, 2021

(86) PCT No.: PCT/CN2021/114425
§ 371 (c)(1),
(2) Date: Jun. 28, 2023

(87) PCT Pub. No.: WO2022/142406
PCT Pub. Date: Jul. 7, 2022

(65) Prior Publication Data
US 2024/0052529 A1    Feb. 15, 2024

(30) Foreign Application Priority Data
Dec. 29, 2020   (CN) .......................... 202011602597.9

(51) Int. Cl.
*D01F 6/84* (2006.01)
*C08G 63/183* (2006.01)
*C08G 63/685* (2006.01)
*C08G 63/80* (2006.01)
*C08G 63/86* (2006.01)
*C08G 63/91* (2006.01)
*D01D 5/08* (2006.01)
*D01F 11/08* (2006.01)

(52) U.S. Cl.
CPC ............ *D01F 6/84* (2013.01); *C08G 63/183* (2013.01); *C08G 63/6856* (2013.01); *C08G 63/80* (2013.01); *C08G 63/866* (2013.01); *C08G 63/916* (2013.01); *D01D 5/08* (2013.01); *D01F 11/08* (2013.01); *D10B 2331/04* (2013.01); *D10B 2401/063* (2013.01)

(58) Field of Classification Search
CPC ........... D06M 15/507; D06M 2101/32; D06M 11/00; D06M 11/28; D06M 15/41; D06M 15/227; D06M 10/00; D06M 7/00; D06M 15/00; D06M 16/00; D06M 23/00; D06M 2101/00; D06M 2200/00; D06M 2400/00; C08G 63/6856; C08G 63/6926; C08G 63/78; C08G 63/80; C08G 63/82; D01F 6/84; D01F 11/08
See application file for complete search history.

(56) References Cited

U.S. PATENT DOCUMENTS

| | | | |
|---|---|---|---|
| 4,079,045 A | 3/1978 | Lazarus et al. | |
| 4,931,532 A | 6/1990 | Reinhardt | |
| 2020/0223981 A1* | 7/2020 | Fan ........................ | C08G 63/80 |

FOREIGN PATENT DOCUMENTS

| CN | 108130609 A | 6/2018 |
|---|---|---|
| CN | 108130611 A | 6/2018 |
| CN | 108976401 A | 12/2018 |
| CN | 111100266 A | 5/2020 |
| CN | 112725920 A | 4/2021 |

OTHER PUBLICATIONS

Simon M. Humphrey et al "Pyridine-2,4-Dicarboxylate: A Versatile Building Block for the Preparation of Functional Coordination Polymers", Journal of Nanoscience and Nanotechnology vol. 10, 34-48, 2010 (Year: 2010).*
Wen Li et al "Dynamic self-assembly of coordination polymers in aqueous solution", Soft Matter, Oct. 2014, 5231 (Year: 2014).*
Cheng-Hui Li et al "Self-Healing Polymers Based on Coordination Bonds", Adv. Mater. 2020, 32, 1903762; Jul. 2020, first published on Oct. 10, 2019. (Year: 2020).*

* cited by examiner

*Primary Examiner* — Frances Tischler
*Assistant Examiner* — Gennadiy Mesh
(74) *Attorney, Agent, or Firm* — Bayramoglu Law Offices LLC

(57) ABSTRACT

A high-strength thermal-stability polyester industrial yarn is prepared by spinning, winding and coordination treatment of a modified polyester after a solid-state polycondensation; wherein the method of coordination treatment comprises: soaking the wound fiber in an aqueous solution of a coordination agent, and the concentration of the aqueous solution of the coordination agent is 0.1-0.2 mol/L; wherein the condition of coordination treatment is 48-72 hours at 80-100° C., and the concentration of the aqueous solution of the coordination agent is 0.1-0.2 mol/L; wherein the polyester segments of the prepared high-strength thermal-stability polyester industrial yarn comprises a terephthalic acid segment, an ethylene glycol segment and a 2,6-pyridinedicarboxylic acid segment, and 2,6-pyridinedicarboxylic acid segments of different polyester segments are coordinated by $Fe^{3+}$, the molar ratio of the terephthalic acid segment to the 2,6-pyridinedicarboxylic acid segment is 1:(0.03-0.05).

11 Claims, No Drawings

HIGH-STRENGTH THERMAL-STABILITY POLYESTER INDUSTRIAL YARN AND PREPARATION METHOD THEREOF

CROSS REFERENCE TO THE RELATED APPLICATIONS

This application is the national phase entry of International Application No. PCT/CN2021/114425, filed on Aug. 25, 2021, which is based upon and claims priority to Chinese Patent Application No. 202011602597.9, filed on Dec. 29, 2020, the entire contents of which are incorporated herein by reference.

TECHNICAL FIELD

The present invention belongs to the field of polyester fiber, and more particularly, relates to a high-strength thermal-stability polyester industrial yarn and preparation method thereof.

BACKGROUND

The high symmetry of the molecular chain structure of the polyester and the rigidity of the benzene ring make the product have good mechanical processing performance, chemical corrosion resistance, anti-microbial erosion performance and so on, and is widely applied to various fields such as fibers, films, and plastic products due to the advantages of relatively low price and easy recycling.

The thermal stability of the polyester is mainly manifested in two aspects, the ability to resist high temperature decomposition and the ability to resist higher environmental temperature when applied. The glass transition temperature is 70-76° C., the melting point is 250-260° C., and the thermal deformation temperature is 80-85° C. In order to meet the requirements of specific situations, the requirements for the performance of the industrial yarn are getting higher and higher, so that the polyester industrial yarn product needs to be innovated and researched. When the polyester fiber is at a temperature higher than the glass transition temperature, the segments of the macromolecular chain start to move, and at this time, if there is a certain external force, the movement of the macromolecular chain will change from vibration to sliding, and its mechanical properties will be greatly reduced.

In the prior art, methods for improving the thermal stability of the polyester include: (1) increasing the setting time or increasing the setting temperature to achieve the purpose of improving the crystallinity and heat resistance of the fiber, but the adjustment of the process to improve the thermal stability of the polyester is limited; (2) introducing heat-resistant groups, such as naphthalene dicarboxylic acid, but due to the high rigidity of the naphthalene ring, it brings great difficulties to processing, especially its melt viscosity is too high; (3) using high-viscosity slices, the increase in viscosity means an increase of molecular weight, that is, the difficulty of molecular chain movement increases and the resistance of movement increases, which can achieve the purpose of improving the heat resistance of the polyester fiber, but the increase of viscosity makes the uniformity of plasticization decrease, so that the processing is difficult, the performance uniformity and stability of the product are reduced, and the post-processing is relatively difficult; (4) blending and filling with other materials is mainly to prevent the movement of molecular chains to increase the glass transition temperature, thereby improving the heat resistance, but at the same time its mechanical properties are affected. There are certain limitations to different degrees of these methods. Improving the thermal stability of polyester industrial yarns in post-processing and use will be more widely applied in industrial yarns.

Since the polyester structure determines the glass transition temperature, in the prior art, if the heat resistance of the polyester fiber needs to be improved, it can only be done by increasing the crystallinity of the fiber and further refining the crystalline morphology, which has limited improvement in heat resistance.

Therefore, it is of great significance to study a kind of high-strength thermal-stability polyester industrial yarn.

SUMMARY

In order to solve the problem of certain limitations in improving the heat resistance of polyester in the prior art, the invention provides a high-strength thermal-stability polyester industrial yarn and preparation method thereof.

The invention solves the technical problem that the thermal stability of the polyester industrial yarn in the prior art is not good, which is manifested in that the mechanical performance of the polyester industrial yarn decreases greatly when the use temperature is higher than the glass transition temperature.

The invention uses the coordination technology to increase the glass transition temperature of the polyester industrial yarn, so as to adapt to and broaden the application of the polyester industrial yarn.

To this end, the technical schemes of the invention are as follows:

A high-strength thermal-stability polyester industrial yarn, comprising: polyester segments of the high-strength thermal-stability polyester industrial yarn comprises a terephthalic acid segment, an ethylene glycol segment and a 2,6-pyridinedicarboxylic acid segment, and 2,6-pyridinedicarboxylic acid segments of different polyester segments are coordinated by $Fe^{3+}$;

wherein the molar ratio of the terephthalic acid segment to the 2,6-pyridinedicarboxylic acid segment is 1:(0.03-0.05);

wherein the O atom on two carbonyl groups and the N atom on the pyridine of the 2,6-pyridinedicarboxylic acid segment are involved in the coordination.

Iron is located in group VIII in the periodic table of elements, and its electron configuration is $[Ar]3d^6 4s^2$, easy to lose two electrons on the 4s orbital and one electron on the 3d orbital to become divalent iron and semi-filled with stable structure of trivalent iron ions, and because iron has a good variable oxidation state, it is easy to coordinate with nitrogen, oxygen and other elements to form stable complexes. The coordination number of $Fe^{3+}$ is 6, forming an octahedral configuration, and forming four five-membered ring structure chelates with 2,6-pyridinedicarboxylic acid (the chelate is a complex with a ring structure, and is obtained by chelating two or more ligands with the same metal ion to form a chelating ring. The stability of the chelate is closely related to the ring formation, which increases the stability of the chelate, wherein the five-membered ring and the six-membered ring are the most stable).

For ligands, most of the commonly used ligands are carboxylic acid ligands: the carboxyl groups in carboxylic acid ligands can have strong coordination and chelation capabilities with metal ions, and can be coordinated with metal ions in various ways.

The advantages of nitrogen-containing carboxylic acid ligands are: (1) the N and O atoms on the ligand can be used as coordination sites at the same time; (2) when the ligand contains multiple carboxyl groups, different topological types of complexes can be formed.

The 2,6-pyridinedicarboxylic acid belongs to nitrogen heterocyclic aromatic carboxylic acid ligands, which integrates the advantages of aromatic carboxylic acid ligands and nitrogen-containing heterocyclic ligands, and has conjugation effect. The conjugation effect increases the stability of the complex, and has a closed large n bond, there is a pair of lone pair electrons on the $sp^2$ orbital of the N atom, which belongs to a non-centrosymmetric structure, and the conjugated electron donating and withdrawing groups can undergo charge transfer in the molecule, have strong coordination ability, and can form stable complexes with main group metal ions, transition metal ions, and rare earth metal ions in various ways, and has a plurality of coordination modes, which is easy to self-assemble with metal ions to form multi-dimensional complexes, specifically form monodentate complexes, bidentate complexes and tridentate complexes with metal ions.

The following preferred technology program is presented to give a detailed description for this invention:

The said high-strength thermal-stability polyester industrial yarn, wherein a coordination structure formed by $Fe^{3+}$ coordination between 2,6-pyridinedicarboxylic acid segments of different polyester segments is:

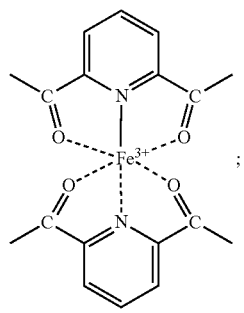

wherein a glass transition temperature of the high-strength thermal-stability polyester industrial yarn is 88-92° C., which is more than 10° C. higher compared to the prior art;

wherein the performance indexes of the high-strength thermal-stability polyester industrial yarn are as follows: a breaking strength≥8.7 cN/dtex, a breaking strength CV value≤3.0%; a breaking elongation of 11.0-13.0%, a breaking elongation CV value≤7.0%; a central value of elongation at 4.0 cN/dtex load is 2.5-3.0%, a deviation rate of elongation at 4.0 cN/dtex load is ±0.7%; and a dry heat shrinkage rate at 177° C., 10 min and 0.05 cN/dtex is 2.5±0.6%.

The invention also provides a method of preparing the high-strength thermal-stability polyester industrial yarn, wherein the high-strength thermal-stability polyester industrial yarn is prepared by spinning, winding and coordination treatment of a modified polyester after a solid-state polycondensation;

wherein the preparation method of the modified polyester comprises, after uniformly mixing terephthalic acid, ethylene glycol and 2,6-pyridinedicarboxylic acid, successively performing an esterification reaction and a polycondensation reaction to obtain the modified polyester;

wherein the method of coordination treatment comprises: soaking the wound fiber in an aqueous solution of a coordination agent, and the concentration of the aqueous solution of the coordination agent is 0.1-0.2 mol/L;

wherein the condition of coordination treatment is 48-72 hours at 80-100° C.;

wherein the coordination agent is $FeCl_3$, $Fe(NO_3)_3$ or $Fe_2(SO_4)_3$.

The diffusion of the coordination agent into polyester fibers can be described by the so-called channel and free-volume models. Above the glass transition temperature of the polyester fiber, the free volume inside the fiber is relatively large, containing many "holes" enough to accommodate the entry of the coordination agent, the coordination agent molecules diffuse through the "hole", and the polyester fiber has multiple movements units, including side groups, segments, and the entire polymer chain, etc., when the coordination agent molecule diffuses into the fiber, the coordination agent molecule is gradually combined with the ligand of the fiber within a certain time to form a relatively stable coordination compound structure unit. The coordination treatment after winding is a method of coordination, which has minimal impact on fiber processing, but takes a longer time; on the other hand, the weak point of the fiber tends to be in the amorphous region, and the method of coordination treatment is optimal for the effect of improving the amorphous region. After Fe(III) is coordinated with pyridine, the anion can participate in the coordination or play a role of neutralizing the charge in the complex.

The following preferred technology program is presented to give a detailed description for this invention:

In the method of preparing the high-strength thermal-stability polyester industrial yarn, wherein the modified polyester is prepared in the following steps:

(1) Esterification concocting the terephthalic acid, the ethylene glycol, and the 2,6-pyridinedicarboxylic acid into a slurry, adding a catalyst and mixing uniformly, then carrying out the esterification under a nitrogen pressure ranged from atmospheric pressure to 0.3 MPa, the temperature of the esterification is 250-260° C., and the termination condition of the esterification is: when a water distillation amount reaches more than 90°/% of a theoretical value; the 2,6-pyridinedicarboxylic acid and the ethylene glycol perform the esterification under acid catalysis, and the carboxylic acid activity thereof is slightly greater than that of the terephthalic acid due to the conjugation effect, but it does not affect the esterification and no special adjustment is needed in the process;

(2) Polycondensation after the esterification, starting a low vacuum stage of the polycondensation under a negative pressure, smoothly reducing the nitrogen pressure to below the absolute pressure of 500 Pa within 30-50 min, the temperature of the polycondensation is 250-260° C. and the time is 30-50 min, and then continue vacuuming to conduct a high vacuum stage of the polycondensation, further reducing the nitrogen pressure to below the absolute pressure of 100 Pa, the temperature of the polycondensation is 270-282° C. and the time is 50-90 min, and the modified polyester is obtained;

wherein the molar ratio of the terephthalic acid, the ethylene glycol and the 2,6-pyridinedicarboxylic acid is 1:(1.2-2.0):(0.03-0.05);

wherein the addition amount of the catalyst is 0.01-0.05 wt % of the addition amount of the terephthalic acid; the catalyst is antimony trioxide, ethylene glycol antimony or antimony acetate;

wherein the intrinsic viscosity of the modified polyester after the solid-state polycondensation is 1.0-1.2 dL/g.

wherein the spinning process of the high-strength thermal-stability polyester industrial yarn involves the following parameters:

a spinning temperature of 290-300° C.;
a side-blowing temperature of 23±2° C.;
a side-blowing wind speed of 0.5-0.6 m/s;
a first godet roller speed of 500-600 m/min;
a second godet roller speed of 520-1000 m/min; a second godet roller temperature of 80-100° C.;
a third godet roller speed of 1800-2500 m/min; a third godet roller temperature of 100-150° C.;
a fourth godet roller speed of 2800-3500 m/min; a fourth godet roller temperature of 200-250° C.;
a fifth godet roller speed of 2800-3500 m/min; a fifth godet roller temperature of 200-250° C.;
a sixth godet roller speed of 2600-3400 m/min; a sixth godet roller temperature of 150-220° C.;
a winding speed of 2570-3360 m/min.

The mechanism of this invention is as follows:

In practical applications, polyester, due to the linear arrangement of molecular chains, is often subject to unavoidable effects on mechanical properties when heated because its segments are not supported by relatively strong cross-linking nodes. The cross-linking point can be a chemical cross-linking node or a physical cross-linking node, wherein the chemical cross-linking structure forms a stable intramolecular chemical bond, while the physical cross-linking structure includes hydrogen bonds, ionic bonds, and coordination bonds, etc.

From the perspective of molecular motion, the three mechanical states of polyester crystalline high polymers with temperature changes are closely related to the different motion states of internal molecules at different temperatures. This is a characteristic of high polymers, that is, a high polymer, with the same structure, can exhibit very different properties only due to different molecular motions. In the glass state, due to the lower temperature, the energy of the molecular motion is very low, which is insufficient to overcome the internal rotation of the potential barrier in the main chain, so that the motion of the segment cannot be excited, the segment is in a frozen state, and only those smaller units with lower activation energy can move. When the temperature rises enough to overcome the internal rotation of the potential barrier, the coordinated motions of internal rotations of dozens of adjacent single bonds are excited, and the segments can start to move to change the conformation of the chain, the high polymer thus enters a high elastic state, at which time the temperature is Tg; when the hydrogen bond between the polyester macromolecules is stretched at a temperature higher than Tg, the hydrogen bond is quickly dissociated, thus showing a significant decrease in breaking strength and breaking elongation. Fe3+ forms a coordination bond with pyridine, and the enhancement of the physical cross-linking point and the intermolecular interaction in the polyester fiber restricts the motion of segments, make it difficult for chains to slip into each other, and more energy is needed when the segment moves to change the conformation of the chain, so that the Tg of the polyester fiber is increased to a certain extent. The Tg is increased from 75-79° C. to 88-92° C., so that the polyester fiber in the invention is stretched under the condition of Tg higher than the conventional polyester Tg, which can better maintain the mechanical properties of the fiber and greatly improve the thermal stability.

In addition, after $Fe^{3+}$ forms a coordination bond with pyridine, the glass transition temperature becomes higher and the polymer segment is more likely to be frozen, the breaking strength of the polyester fiber coordinated by $FeCl_3$ is enhanced to a certain extent;

Benefits (1) The preparation method of the high-strength thermal-stability polyester industrial yarn of the present invention, Fe(III)-pyridine coordination plays a key role in the enhanced physical dots, improving the glass transition temperature of the polyester fiber;

(2) The preparation method of the high-strength thermal-stability polyester industrial yarn of the present invention, after $Fe^{3+}$ forms a coordination bond with pyridine, the glass transition temperature becomes higher and the polymer segment is more likely to be frozen, the breaking strength of the polyester fiber coordinated by $FeCl_3$ is enhanced to a certain extent;

(3) The high-strength thermal-stability polyester industrial yarn of the present invention, the Tg is 88-92° C., when stretching at a temperature of 85° C., it has a breaking strength of ≥7.60 cN/dtex, a breaking elongation of 10.2-13.5%, and has excellent mechanical properties and thermal stability.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method of preparing the high-strength thermal-stability polyester industrial yarn, comprising the following steps:

(1) preparation of the modified polyester (1.1) esterification concocting the terephthalic acid, the ethylene glycol, and the 2,6-pyridinedicarboxylic acid with a molar ratio of 1:1.2:0.03 into a slurry, adding the catalyst (antimony trioxide) and mixing uniformly, wherein the addition amount of the catalyst is 0.03 wt % of the addition amount of the terephthalic acid, then carrying out the esterification under the nitrogen pressure of 0.2 MPa, the temperature of the esterification is 254° C., and the termination condition of the esterification is: when the water distillation amount reaches 97% of the theoretical value;

(1.2) polycondensation after the esterification, starting a low vacuum stage of the polycondensation under a negative pressure, smoothly reducing the nitrogen pressure to the absolute pressure of 460 Pa within 40 min, the temperature of the polycondensation is 256° C. and the time is 35 min, and then continue vacuuming to conduct a high vacuum stage of the polycondensation, further reducing the nitrogen pressure to the absolute pressure of 30 Pa, the temperature of the polycondensation is 280° C. and the time is 55 min, and the modified polyester is obtained;

(2) spinning and winding the prepared modified polyester after a solid-state polycondensation;

wherein the intrinsic viscosity of the modified polyester after the solid-state polycondensation is 1.2 dL/g;

wherein the spinning process involves the following parameters:

a spinning temperature of 290° C.;
a side-blowing temperature of 210° C.;
a side-blowing wind speed of 0.5 m/s;
a first godet roller speed of 500 m/min;
a second godet roller speed of 520 m/min; a second godet roller temperature of 80° C.;
a third godet roller speed of 1800 m/min; a third godet roller temperature of 100° C.;
a fourth godet roller speed of 2800 m/min; a fourth godet roller temperature of 200° C.;
a fifth godet roller speed of 2800 m/min; a fifth godet roller temperature of 200° C.;
a sixth godet roller speed of 2600 m/min; a sixth godet roller temperature of 150° C.;
a winding speed of 2570 m/min.

(3) coordination treatment: soaking the wound fiber in the aqueous solution of the coordination agent for 63 hours at 88° C. to obtain the high-strength thermal-stability polyester industrial yarn; wherein the coordination agent is $FeCl_3$, and the concentration of the aqueous solution of the coordination agent is 0.1 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.03; wherein the 2,6-pyridinedicarboxylic acid segments of different polyester segments are coordinated by $Fe^{3+}$, and the O atom on two carbonyl groups and the N atom on the pyridine of the 2,6-pyridinedicarboxylic acid segment are involved in the coordination; wherein the coordination structure formed by coordination is:

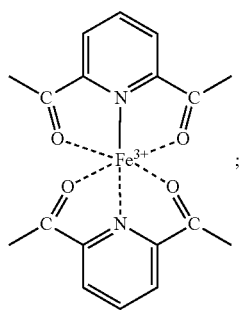

wherein the glass transition temperature of the high-strength thermal-stability polyester industrial yarn is 88° C.; wherein the breaking strength is 8.7 cN/dtex, the breaking strength CV value is 3%; the breaking elongation is 13.0%, the breaking elongation CV value is 7.0%; the central value of elongation at 4.0 cN/dtex load is 2.8%, the deviation rate of elongation at 4.0 cN/dtex load is +0.7%; and the dry heat shrinkage rate at 177° C., 10 min and 0.05 cN/dtex is 3.1%.

Example 2

A method of preparing the high-strength thermal-stability polyester industrial yarn, comprising the following steps:

(1) preparation of the modified polyester
(1.1) esterification
concocting the terephthalic acid, the ethylene glycol, and the 2,6-pyridinedicarboxylic acid with a molar ratio of 1:1.2:0.04 into a slurry, adding the catalyst (antimony trioxide) and mixing uniformly, wherein the addition amount of the catalyst is 0.01 wt % of the addition amount of the terephthalic acid, then carrying out the esterification under the nitrogen pressure of 0.2 MPa, the temperature of the esterification is 256° C., and the termination condition of the esterification is: when the water distillation amount reaches 96% of the theoretical value;

(1.2) polycondensation
after the esterification, starting a low vacuum stage of the polycondensation under a negative pressure, smoothly reducing the nitrogen pressure to the absolute pressure of 490 Pa within 49 min, the temperature of the polycondensation is 252° C. and the time is 50 min, and then continue vacuuming to conduct a high vacuum stage of the polycondensation, further reducing the nitrogen pressure to the absolute pressure of 30 Pa, the temperature of the polycondensation is 275° C. and the time is 80 min, and the modified polyester is obtained;

(2) spinning and winding the prepared modified polyester after a solid-state polycondensation;

wherein the intrinsic viscosity of the modified polyester after the solid-state polycondensation is 1 dL/g;

wherein the spinning process involves the following parameters:

a spinning temperature of 295° C.;
a side-blowing temperature of 22° C.;
a side-blowing wind speed of 0.5 m/s;
a first godet roller speed of 520 m/min;
a second godet roller speed of 620 m/min; a second godet roller temperature of 82° C.;
a third godet roller speed of 1900 m/min; a third godet roller temperature of 110° C.;
a fourth godet roller speed of 2900 m/min; a fourth godet roller temperature of 210° C.;
a fifth godet roller speed of 2900 m/min; a fifth godet roller temperature of 210° C.;
a sixth godet roller speed of 2750 m/min; a sixth godet roller temperature of 160° C.;
a winding speed of 2700 m/min.

(3) coordination treatment: soaking the wound fiber in the aqueous solution of the coordination agent for 60 hours at 92° C. to obtain the high-strength thermal-stability polyester industrial yarn; wherein the coordination agent is $FeCl_3$, and the concentration of the aqueous solution of the coordination agent is 0.1 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.04; wherein the 2,6-pyridinedicarboxylic acid segments of different polyester segments are coordinated by $Fe^3$, and the O atom on two carbonyl groups and the N atom on the pyridine of the 2,6-pyridinedicarboxylic acid segment are involved in the coordination; wherein the coordination structure formed by coordination is:

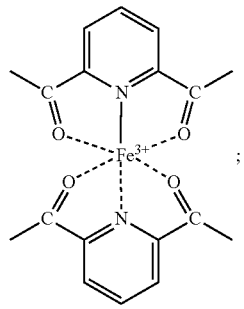

wherein the glass transition temperature of the high-strength thermal-stability polyester industrial yarn is 88° C.; wherein the breaking strength is 8.8 cN/dtex, the breaking strength CV value is 2.87%; the breaking elongation is 12.8%, the breaking elongation CV value is 6.4%; the central value of elongation at 4.0 cN/dtex load is 2.9%, the deviation rate of elongation at 4.0 cN/dtex load is +0.5%; and the dry heat shrinkage rate at 177° C., 10 min and 0.05 cN/dtex is 2.8%.

Example 3

A method of preparing the high-strength thermal-stability polyester industrial yarn, comprising the following steps:
(1) preparation of the modified polyester
(1.1) esterification
concocting the terephthalic acid, the ethylene glycol, and the 2,6-pyridinedicarboxylic acid with a molar ratio of 1:1.2:0.05 into a slurry, adding the catalyst (ethylene glycol antimony) and mixing uniformly, wherein the addition amount of the catalyst is 0.03 wt % of the addition amount of the terephthalic acid, then carrying out the esterification under the nitrogen pressure of 0.1 MPa, the temperature of the esterification is 250° C., and the termination condition of the esterification is: when the water distillation amount reaches 95% of the theoretical value;
(1.2) polycondensation
after the esterification, starting a low vacuum stage of the polycondensation under a negative pressure, smoothly reducing the nitrogen pressure to the absolute pressure of 480 Pa within 46 min, the temperature of the polycondensation is 254° C. and the time is 45 min, and then continue vacuuming to conduct a high vacuum stage of the polycondensation, further reducing the nitrogen pressure to the absolute pressure of 25 Pa, the temperature of the polycondensation is 275° C. and the time is 70 min, and the modified polyester is obtained;
(2) spinning and winding the prepared modified polyester after a solid-state polycondensation;
wherein the intrinsic viscosity of the modified polyester after the solid-state polycondensation is 1 dL/g;
wherein the spinning process involves the following parameters:
a spinning temperature of 297° C.;
a side-blowing temperature of 23° C.;
a side-blowing wind speed of 0.5 m/s;
a first godet roller speed of 540 m/min;
a second godet roller speed of 720 m/min; a second godet roller temperature of 84° C.;
a third godet roller speed of 2000 m/min; a third godet roller temperature of 120° C.;
a fourth godet roller speed of 3000 m/min; a fourth godet roller temperature of 220° C.;
a fifth godet roller speed of 3000 m/min; a fifth godet roller temperature of 220° C.;
a sixth godet roller speed of 2800 m/min; a sixth godet roller temperature of 170° C.;
a winding speed of 2570 m/min.
(3) coordination treatment: soaking the wound fiber in the aqueous solution of the coordination agent for 66 hours at 84° C. to obtain the high-strength thermal-stability polyester industrial yarn; wherein the coordination agent is $FeCl_3$, and the concentration of the aqueous solution of the coordination agent is 0.1 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.05; wherein the 2,6-pyridinedicarboxylic acid segments of different polyester segments are coordinated by $Fe^{3+}$, and the O atom on two carbonyl groups and the N atom on the pyridine of the 2,6-pyridinedicarboxylic acid segment are involved in the coordination; wherein the coordination structure formed by coordination is:

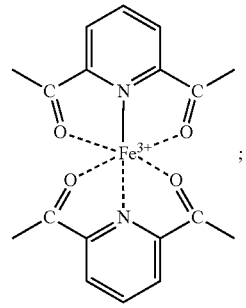

wherein the glass transition temperature of the high-strength thermal-stability polyester industrial yarn is 91° C.; wherein the breaking strength is 8.9 cN/dtex, the breaking strength CV value is 2.8%; the breaking elongation is 12.5%, the breaking elongation CV value is 6.3%; the central value of elongation at 4.0 cN/dtex load is 2.5%, the deviation rate of elongation at 4.0 cN/dtex load is +0.2%; and the dry heat shrinkage rate at 177° C., 10 min and 0.05 cN/dtex is 2.7%.

Example 4

A method of preparing the high-strength thermal-stability polyester industrial yarn, comprising the following steps:
(1) preparation of the modified polyester
(1.1) esterification
concocting the terephthalic acid, the ethylene glycol, and the 2,6-pyridinedicarboxylic acid with a molar ratio of 1:1.5:0.03 into a slurry, adding the catalyst (ethylene glycol antimony) and mixing uniformly, wherein the addition amount of the catalyst is 0.035 wt % of the addition amount of the terephthalic acid, then carrying out the esterification under the nitrogen pressure of 0.1 MPa, the temperature of the esterification is 252° C., and the termination condition of the esterification is: when the water distillation amount reaches 90% of the theoretical value;

(1.2) polycondensation after the esterification, starting a low vacuum stage of the polycondensation under a negative pressure, smoothly reducing the nitrogen pressure to the absolute pressure of 470 Pa within 30 min, the temperature of the polycondensation is 255° C. and the time is 40 min, and then continue vacuuming to conduct a high vacuum stage of the polycondensation, further reducing the nitrogen pressure to the absolute pressure of 10 Pa, the temperature of the polycondensation is 277° C. and the time is 60 min, and the modified polyester is obtained;

(2) spinning and winding the prepared modified polyester after a solid-state polycondensation;

wherein the intrinsic viscosity of the modified polyester after the solid-state polycondensation is 1.1 dL/g;

wherein the spinning process involves the following parameters:

a spinning temperature of 295° C.;
a side-blowing temperature of 23° C.;
a side-blowing wind speed of 0.5 m/s;
a first godet roller speed of 560 m/min;
a second godet roller speed of 820 m/min; a second godet roller temperature of 86° C.;
a third godet roller speed of 2100 m/min; a third godet roller temperature of 130° C.;
a fourth godet roller speed of 3100 m/min; a fourth godet roller temperature of 230° C.;
a fifth godet roller speed of 3100 m/min; a fifth godet roller temperature of 230° C.;
a sixth godet roller speed of 2900 m/min; a sixth godet roller temperature of 180° C.; a winding speed of 2810 m/min.

(3) coordination treatment: soaking the wound fiber in the aqueous solution of the coordination agent for 72 hours at 80° C. to obtain the high-strength thermal-stability polyester industrial yarn; wherein the coordination agent is $Fe(NO_3)_3$, and the concentration of the aqueous solution of the coordination agent is 0.15 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.03; wherein the 2,6-pyridinedicarboxylic acid segments of different polyester segments are coordinated by $Fe^{3+}$, and the O atom on two carbonyl groups and the N atom on the pyridine of the 2,6-pyridinedicarboxylic acid segment are involved in the coordination; wherein the coordination structure formed by coordination is:

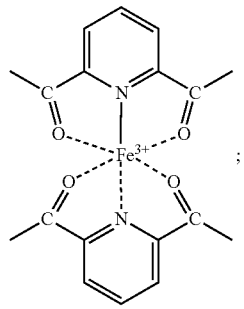

wherein the glass transition temperature of the high-strength thermal-stability polyester industrial yarn is 89° C.; wherein the breaking strength is 8.75 cN/dtex, the breaking strength CV value is 2.95%; the breaking elongation is 12.7%, the breaking elongation CV value is 6.6%; the central value of elongation at 4.0 cN/dtex load is 2.7%, the deviation rate of elongation at 4.0 cN/dtex load is −0.7%; and the dry heat shrinkage rate at 177° C., 10 min and 0.05 cN/dtex is 2.9%.

Example 5

A method of preparing the high-strength thermal-stability polyester industrial yarn, comprising the following steps:

(1) preparation of the modified polyester (1.1) esterification concocting the terephthalic acid, the ethylene glycol, and the 2,6-pyridinedicarboxylic acid with a molar ratio of 1:1.5:0.05 into a slurry, adding the catalyst (antimony acetate) and mixing uniformly, wherein the addition amount of the catalyst is 0.04 wt % of the addition amount of the terephthalic acid, then carrying out the esterification under the nitrogen pressure of 0.3 MPa, the temperature of the esterification is 258° C., and the termination condition of the esterification is: when the water distillation amount reaches 96% of the theoretical value;

(1.2) polycondensation after the esterification, starting a low vacuum stage of the polycondensation under a negative pressure, smoothly reducing the nitrogen pressure to the absolute pressure of 500 Pa within 45 min, the temperature of the polycondensation is 250° C. and the time is 50 min, and then continue vacuuming to conduct a high vacuum stage of the polycondensation, further reducing the nitrogen pressure to the absolute pressure of 25 Pa, the temperature of the polycondensation is 278° C. and the time is 55 min, and the modified polyester is obtained;

(2) spinning and winding the prepared modified polyester after a solid-state polycondensation;

wherein the intrinsic viscosity of the modified polyester after the solid-state polycondensation is 1.1 dL/g;

wherein the spinning process involves the following parameters;

a spinning temperature of 296° C.;
a side-blowing temperature of 24° C.;
a side-blowing wind speed of 0.6 m/s;
a first godet roller speed of 570 m/min;
a second godet roller speed of 950 m/min; a second godet roller temperature of 92° C.;
a third godet roller speed of 2200 m/min; a third godet roller temperature of 140° C.;
a fourth godet roller speed of 3300 m/min; a fourth godet roller temperature of 240° C.;
a fifth godet roller speed of 3200 m/min; a fifth godet roller temperature of 240° C.;
a sixth godet roller speed of 3100 m/min; a sixth godet roller temperature of 190° C.;
a winding speed of 3080 m/min.

(3) coordination treatment: soaking the wound fiber in the aqueous solution of the coordination agent for 68 hours at 82° C. to obtain the high-strength thermal-stability polyester industrial yarn; wherein the coordination agent is $Fe(NO_3)_3$, and the concentration of the aqueous solution of the coordination agent is 0.15 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.05; wherein the 2,6-pyridinedicarboxylic acid segments of different polyester segments are coordinated by $Fe^{3+}$, and the O atom on two carbonyl groups and the N atom on the pyridine of the 2,6-pyridinedicarboxylic acid segment are involved in the coordination; wherein the coordination structure formed by coordination is:

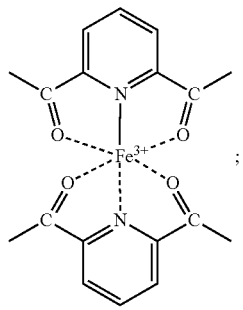

wherein the glass transition temperature of the high-strength thermal-stability polyester industrial yarn is 91° C.; wherein the breaking strength is 9 cN/dtex, the breaking strength CV value is 2.9%; the breaking elongation is 11.8%, the breaking elongation CV value is 6.4%; the central value of elongation at 4.0 cN/dtex load is 2.5%, the deviation rate of elongation at 4.0 cN/dtex load is −0.5%; and the dry heat shrinkage rate at 177° C., 10 min and 0.05 cN/dtex is 2.2%.

Example 6

A method of preparing the high-strength thermal-stability polyester industrial yarn, comprising the following steps:
(1) preparation of the modified polyester
(1.1) esterification
concocting the terephthalic acid, the ethylene glycol, and the 2,6-pyridinedicarboxylic acid with a molar ratio of 1:2:0.03 into a slurry, adding the catalyst (antimony acetate) and mixing uniformly, wherein the addition amount of the catalyst is 0.04 wt % of the addition amount of the terephthalic acid, then carrying out the esterification under the nitrogen pressure of 0.3 MPa, the temperature of the esterification is 259° C., and the termination condition of the esterification is: when the water distillation amount reaches 97% of the theoretical value;
(1.2) polycondensation
after the esterification, starting a low vacuum stage of the polycondensation under a negative pressure, smoothly reducing the nitrogen pressure to the absolute pressure of 450 Pa within 50 min, the temperature of the polycondensation is 258° C. and the time is 35 min, and then continue vacuuming to conduct a high vacuum stage of the polycondensation, further reducing the nitrogen pressure to the absolute pressure of 15 Pa, the temperature of the polycondensation is 270° C. and the time is 90 min, and the modified polyester is obtained;
(2) spinning and winding the prepared modified polyester after a solid-state polycondensation;
wherein the intrinsic viscosity of the modified polyester after the solid-state polycondensation is 1.2 dL/g;
wherein the spinning process involves the following parameters:

a spinning temperature of 298° C.;
a side-blowing temperature of 24° C.;
a side-blowing wind speed of 0.6 m/s;
a first godet roller speed of 580 m/min;
a second godet roller speed of 950 m/min; a second godet roller temperature of 96° C.;
a third godet roller speed of 2400 m/min; a third godet roller temperature of 145° C.;
a fourth godet roller speed of 3400 m/min; a fourth godet roller temperature of 245° C.;
a fifth godet roller speed of 3300 m/min; a fifth godet roller temperature of 245° C.;
a sixth godet roller speed of 3300 m/min; a sixth godet roller temperature of 210° C.;
a winding speed of 3270 m/min.
(3) coordination treatment: soaking the wound fiber in the aqueous solution of the coordination agent for 55 hours at 96° C. to obtain the high-strength thermal-stability polyester industrial yarn, wherein the coordination agent is $Fe_2(SO_4)_3$, and the concentration of the aqueous solution of the coordination agent is 0.2 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.03; wherein the 2,6-pyridinedicarboxylic acid segments of different polyester segments are coordinated by $Fe^3$, and the O atom on two carbonyl groups and the N atom on the pyridine of the 2,6-pyridinedicarboxylic acid segment are involved in the coordination; wherein the coordination structure formed by coordination is:

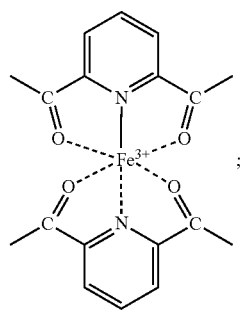

wherein the glass transition temperature of the high-strength thermal-stability polyester industrial yarn is 90° C.; wherein the breaking strength is 8.8 cN/dtex, the breaking strength CV value is 2.76%; the breaking elongation is 12%, the breaking elongation CV value is 6.8%; the central value of elongation at 4.0 cN/dtex load is 2.6%, the deviation rate of elongation at 4.0 cN/dtex load is −0.7%; and the dry heat shrinkage rate at 177° C., 10 min and 0.05 cN/dtex is 2.4%.

Example 7

A method of preparing the high-strength thermal-stability polyester industrial yarn, comprising the following steps:
(1) preparation of the modified polyester
(1.1) esterification
concocting the terephthalic acid, the ethylene glycol, and the 2,6-pyridinedicarboxylic acid with a molar ratio of 1:2:0.05 into a slurry, adding the catalyst (antimony acetate) and mixing uniformly, wherein the addition amount of the catalyst is 0.05 wt % of the addition amount of the terephthalic acid, then carrying out the esterification under the nitrogen pressure of 0.3 MPa, the temperature of the esterification is 260° C., and the termination condition of the esterification is: when the water distillation amount reaches 98% of the theoretical value;

(1.2) polycondensation after the esterification, starting a low vacuum stage of the polycondensation under a negative pressure, smoothly reducing the nitrogen pressure to the absolute pressure of 440 Pa within 50 min, the temperature of the polycondensation is 260° C. and the time is 30 min, and then continue vacuuming to conduct a high vacuum stage of the polycondensation, further reducing the nitrogen pressure to the absolute pressure of 10 Pa, the temperature of the polycondensation is 282° C. and the time is 50 min, and the modified polyester is obtained;

(2) spinning and winding the prepared modified polyester after a solid-state polycondensation;

wherein the intrinsic viscosity of the modified polyester after the solid-state polycondensation is 1 dL/g;

wherein the spinning process involves the following parameters;

a spinning temperature of 300° C.;

a side-blowing temperature of 25° C.;

a side-blowing wind speed of 0.6 m/s;

a first godet roller speed of 600 m/min;

a second godet roller speed of 1000 m/min; a second godet roller temperature of 100° C.;

a third godet roller speed of 2500 m/min; a third godet roller temperature of 150° C.;

a fourth godet roller speed of 3500 m/min; a fourth godet roller temperature of 250° C.;

a fifth godet roller speed of 3500 m/min; a fifth godet roller temperature of 250° C.;

a sixth godet roller speed of 3400 m/min; a sixth godet roller temperature of 220° C.;

a winding speed of 3360 m/min.

(3) coordination treatment: soaking the wound fiber in the aqueous solution of the coordination agent for 48 hours at 100° C. to obtain the high-strength thermal-stability polyester industrial yarn; wherein the coordination agent is $Fe_2(SO_4)_3$, and the concentration of the aqueous solution of the coordination agent is 0.2 mol/L.

The polyester segments of the prepared high-strength thermal-stability polyester industrial yarn comprises a terephthalic acid segment, an ethylene glycol segment and a 2,6-pyridinedicarboxylic acid segment; wherein the molar ratio of the terephthalic acid segment to the 2,6-pyridinedicarboxylic acid segment is 1:0.05; wherein the 2,6-pyridinedicarboxylic acid segments of different polyester segments are coordinated by $Fe^{3+}$, and the O atom on two carbonyl groups and the N atom on the pyridine of the 2,6-pyridinedicarboxylic acid segment are involved in the coordination; wherein the coordination structure formed by coordination is:

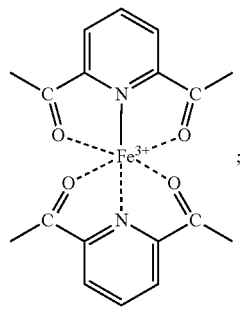

wherein the glass transition temperature of the high-strength thermal-stability polyester industrial yarn is 92° C.; wherein the breaking strength is 9.1 cN/dtex, the breaking strength CV value is 2.7%; the breaking elongation is 11%, the breaking elongation CV value is 6.9%; the central value of elongation at 4.0 cN/dtex load is 3%, the deviation rate of elongation at 4.0 cN/dtex load is −0.4%; and the dry heat shrinkage rate at 177° C., 10 min and 0.05 cN/dtex is 1.9%.

What is claimed is:

1. A thermal-stability polyester industrial yarn, comprising polyester, wherein the polyester comprises a terephthalic acid, an ethylene glycol and a 2,6-pyridinedicarboxylic acid, and wherein 2,6-pyridinedicarboxylic acid is coordinated by an $Fe^{3+}$ coordination agent;

wherein a molar ratio of the terephthalic acid to the 2,6-pyridinedicarboxylic acid is 1:(0.03-0.05);

wherein O atoms on two carbonyl groups and N atoms of the 2,6-pyridinedicarboxylic acid are involved in the coordination;

wherein a coordination structure formed between the $Fe^{3+}$ coordination agent and the 2,6-pyridinedicarboxylic acid is:

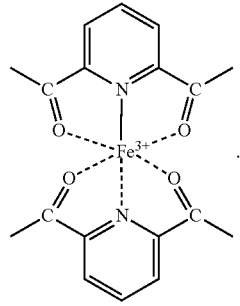

wherein a glass transition temperature of the thermal-stability polyester industrial yarn is 88-92° C., wherein the thermal-stability polyester industrial yarn is formed by soaking wound fibers in an aqueous solution of the coordination agent at 80-100° C. for 48-72 hours, and a concentration of the aqueous solution of the coordination agent is 0.1-0.2 mol/L; and wherein the coordination agent is $FeCl_3$, $Fe(NO_3)_3$ or $Fe_2(SO_4)_3$.

2. The thermal-stability polyester industrial yarn of claim 1, wherein the yarn has the following properties: a breaking strength≥8.7 cN/dtex, a breaking strength coefficient of variation (CV) value≤3.0%; a breaking elongation of 11.0-13.0%, a breaking elongation CV value≤7.0%; a value of elongation at 4.0 cN/dtex load is 2.5-3.0%, a deviation rate of elongation at 4.0 cN/dtex load is ±0.7%; a dry heat shrinkage rate at 177° C., 10 min and 0.05 cN/dtex is 2.5±0.6%.

3. A method for production of the thermal-stability polyester industrial yarn of claim 1, wherein the polyester is prepared by the following steps:

(1) esterification mixing the terephthalic acid, the ethylene glycol, and the 2,6-pyridinedicarboxylic acid into a slurry, adding a catalyst and mixing uniformly, then carrying out the esterification under a nitrogen pressure ranged from atmospheric pressure to 0.3 MPa, a temperature of the esterification is 250-260° ° C., and a termination condition of the esterification is: when a water distillation amount reaches more than 90% of a theoretical value;

(2) polycondensation after the esterification, starting a low vacuum stage of the polycondensation under a negative pressure, reducing the nitrogen pressure to below an absolute pressure of 500 Pa within 30-50 min, a temperature of the polycondensation is 250-260° C. and a time is 30-50 min, and then continue vacuum to conduct the polycondensation, further reducing the nitrogen pressure to below the absolute pressure of 100 Pa, the temperature of the polycondensation is 270-282° C. and the time is 50-90 min, and the polyester is obtained, wherein a molar ratio of the terephthalic acid, the ethylene glycol and the 2,6-pyridinedicarboxylic acid is 1:(1.2-2.0):(0.03-0.05).

4. The method of claim 3, wherein an intrinsic viscosity of the polyester after a solid-state polycondensation is 1.0-1.2 dL/g.

5. A method for production of the thermal-stability polyester industrial yarn of claim 1, comprising a spinning process, wherein the spinning process comprises:

a spinning temperature at 290-300° C.;
a side-blowing temperature at 23±2° C.;
a side-blowing wind speed of 0.5-0.6 m/s;
a first godet roller speed of 500-600 m/min;
a second godet roller speed of 520-1000 m/min; a second godet roller temperature of 80-100° C.;
a third godet roller speed of 1800-2500 m/min; a third godet roller temperature of 100-150° C.;
a fourth godet roller speed of 2800-3500 m/min; a fourth godet roller temperature of 200-250° C.;
a fifth godet roller speed of 2800-3500 m/min; a fifth godet roller temperature of 200-250° C.;
a sixth godet roller speed of 2600-3400 m/min; a sixth godet roller temperature of 150-220° C.; and
a winding speed of 2570-3360 m/min.

6. The thermal-stability polyester industrial yarn of claim 1, wherein the $Fe^{3+}$ is from $FeCl_3$.

7. The thermal-stability polyester industrial yarn of claim 1, wherein the $Fe^{3+}$ is from $Fe(NO_3)_3$.

8. The thermal-stability polyester industrial yarn of claim 1, wherein the $Fe^{3+}$ is from $Fe_2(SO_4)_3$.

9. The thermal-stability polyester industrial yarn of claim 1, wherein the molar ratio of the terephthalic acid to the 2,6-pyridinedicarboxylic acid is 1:0.03.

10. The thermal-stability polyester industrial yarn of claim 1, wherein the molar ratio of the terephthalic acid to the 2,6-pyridinedicarboxylic acid is 1:0.04.

11. The thermal-stability polyester industrial yarn of claim 1, wherein the molar ratio of the terephthalic acid to the 2,6-pyridinedicarboxylic acid is 1:0.05.

\* \* \* \* \*